United States Patent [19]

Yamamoto et al.

[11] Patent Number: 4,798,445

[45] Date of Patent: Jan. 17, 1989

[54] PLASTIC OPTICAL FIBER AND PROCESS FOR PRODUCING THE SAME

[75] Inventors: Takashi Yamamoto, Hiroshima; Katsuhiko Shimada, Otake; Ryuji Murata, Otake; Yasuteru Tahara, Otake; Hiromu Terada, Otake; Kenichi Sakunaga, Otake, all of Japan

[73] Assignee: Misubishi Rayon Co., Ltd., Tokyo, Japan

[21] Appl. No.: 847,515

[22] Filed: Apr. 3, 1986

[30] Foreign Application Priority Data

May 17, 1985 [JP] Japan .................. 60-103876

[51] Int. Cl.$^4$ ................................. G02B 6/16
[52] U.S. Cl. .................. 350/96.34; 264/1.5; 350/96.29; 350/96.33
[58] Field of Search ........... 264/1.1, 1.5, 174; 350/96.29, 96.30, 96.33, 96.34

[56] References Cited

U.S. PATENT DOCUMENTS

| | | | |
|---|---|---|---|
| 3,993,834 | 11/1976 | Chimura et al. | 264/1.5 X |
| 4,161,500 | 7/1979 | Schleinitz et al. | 264/1.5 |
| 4,334,733 | 6/1982 | Takeshima et al. | 350/96.33 |

FOREIGN PATENT DOCUMENTS

| | | | |
|---|---|---|---|
| 0098578 | 1/1984 | European Pat. Off. | 264/1.5 |
| 0126428 | 11/1984 | European Pat. Off. | 264/1.5 |
| 0128516 | 12/1984 | European Pat. Off. | |
| 0128517 | 12/1984 | European Pat. Off. | 350/96.34 |
| 59-75202 | 4/1984 | Japan | 264/1.5 |
| 60-032004 | 2/1985 | Japan . | |
| 60-021012 | 2/1985 | Japan . | |

*Primary Examiner*—John D. Lee
*Attorney, Agent, or Firm*—Oblon, Fisher, Spivak, McClelland & Maier

[57] ABSTRACT

A plastic optical fiber which is superior in the light transmission characteristics, particularly in those within a visible light region and also superior in heat resistance, and a process for producing the same are provided, which plastic optical fiber comprises a polycarbonate as its core material and a polymer as its cladding material having a refractive index lower than that of the core material, wherein the relationship between the light transmission loss $L_{500}$ (dB/km) of the fiber as measured at a wavelength of 500 nm and that as measured at 660 nm being expressed by the following inequality:

$$L_{500} < L_{660} + 4,000.$$

13 Claims, 4 Drawing Sheets

PLASTIC OPTICAL FIBER AND PROCESS FOR PRODUCING THE SAME

BACKGROUND OF THE INVENTION

1. Field of the Invention

The present invention relates to a plastic optical fiber which transmits visible ray with a small transmission loss and a process for producing the same.

2. Description of the Prior Art

As to optical fibers, those of inorganic glass having superior light transmitting properties over a wide range of wavelengths have so far been known. However, inorganic glass type optical fibers are inferior in processability and in resistance to flexural stress, and they are expensive. Accordingly, optical fibers mainly composed of synthetic resins have been developed. Plastic optical fibers are composed, for example, of as a core material, a polymer having a higher refractive index and superior light transmitting properties and as a cladding material, a transparent polymer having a lower refractive index to shape a core-and-cladding structure. As the core material polymer having superior light transmitting properties, amorphous polymers are preferred and polymethyl methacrylate, polycarbonate or polystyrene has generally been used.

Among these polymers, polymethyl methacrylate is superior not only in light transmitting properties but also in mechanical properties, weather resistance, etc., and therefore, it has been used as a core material for high-performance, plastic optical fibers on a commercial scale. However, plastic optical fibers using polymethyl methacrylate as the core material has a glass transition temperature (Tg) of 100° C. so that it cannot be used at all when its service environmental temperature exceeds 100° C. Thus, such a limit of the service temperature of polymethyl methacrylate has restricted its use for plastic optical fibers.

On the other hand, as to plastic optical fibers using polycarbonate as the core material, various proposals have been made. However, as compared with fibers using polymethyl methacrylate, as the core material, fibers using polycarbonate are far inferior particularly in light transmitting properties as to light of visible light wavelengths. Hence presently they have not yet been commercially employed for practical use in spite of their superior heat resistance.

Figure 10:
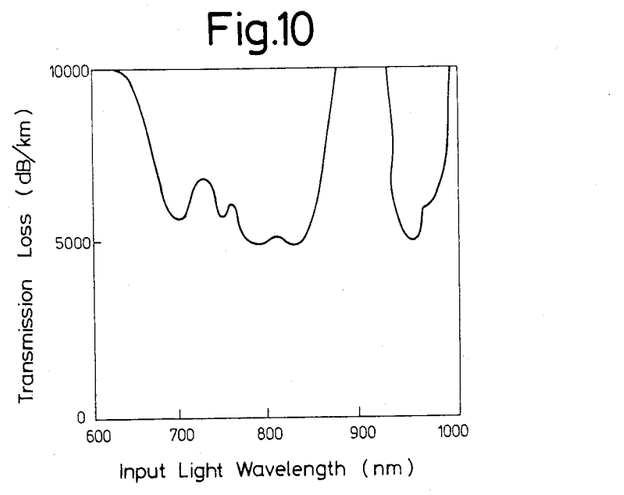
FIG. 10 shows a graph illustrating the light transmitting characteristics of an optical fiber using a polycarbonate as its core material produced according to a conventional process. The transmission loss (dB/km) is plotted along the ordinate axis and the wavelength of input light (nm) is plotted along the abscissa axis.

For example, the transmitting characteristics of an optical fiber using polycarbonate as the core material, reported by Tanaka et al in Japanese Electronic Correspondence Society, Collective, Wh Country Grand Meeting, 1985 (collected previous manuscripts) is shown in FIG. 10 of the accompanying drawings. Namely, at the wavelengths of 775 nm, 820 nm and 948 nm, the loss is minimum (5,100 dB/km), whereas within a wavelength region of blue color to green color, light of 500 nm is not transmitted at all. Further, as to an optical fiber using polycarbonate as the core material, too, disclosed in Japanese patent application laid-open No. 57-46204/1982, light transmission has been observed only within an infrared ray region of 950 nm wavelength.

The present inventors have made extensive research in order to overcome the drawback of conventional optical fibers having polycarbonate as the core material, and as a result have found an optical fiber having a little variation in the light transmitting characteristics within a visible light region.

SUMMARY OF THE INVENTION

The object of the present invention is to provide a plastic optical fiber which is remarkably superior in light transmitting characteristics, particularly light transmitting characteristics within the visible light region; exhibits light transmitting characteristics having a relatively little variance over from a blue color wavelength of 500 nm to a red color wavelength of 660 nm; even when white light is the input, gives an outgoing light having little coloration; and is superior in heat resistance, and a process for producing the plastic optical fiber.

The present invention in a first aspect resides in a plastic optical fiber comprising a polycarbonate as its core material and a polymer as its cladding material having a refractive index lower than that of the core material, the relationship between the light transmission loss $L_{500}$ (dB/km) of said fiber as measured at a wavelength of 500 nm and the light transmission loss $L_{660}$ (dB/km) thereof as measured at a wavelength of 660 nm being expressed by the following relation (I):

$$L_{500} < L_{660} + 4,000 \text{ dB/km} \tag{I}$$

The above $L_{660}$ is preferred to be 1,000 dB/km or less.

The plastic optical fiber which satisfies the above-mentioned relation (I) may be produced, for example, by using a polycarbonate not heated to a temperature exceeding the crystalline melting point of the polycarbonate, at the steps other than melt-spinning step.

If the above relation (I) in the present invention is not satisfied, $L_{500}$ i.e. the light transmission loss of blue color light becomes far larger than $L_{660}$ i.e. the light transmission loss of red color light; hence when white light is used as a light source, red color is selectively transmitted, and the outgoing light becomes deep red to make it entirely impossible to use the fiber for applications such as lighting, illumination, light guides, image transmission, etc. The relationship between $L_{500}$ and $L_{660}$ is preferred to be as follows:

$$L_{500} < L_{660} + 2,500 \text{ dB/km}$$

The present invention in a second aspect resides in a process for producing a plastic optical fiber wherein a polycarbonate is used as the core material of the fiber and a polymer having a refractive index lower than that of the core material is used as the cladding material thereof; as said polycarbonate, a polycarbonate not heated to a temperature exceeding the crystalline melting point thereof is selectively used; and said fiber is shaped by melt-spinning.

BRIEF DESCRIPTION OF THE DRAWINGS

The transmission loss (dB/km) is plotted along the ordinate axis and the wavelength of input light (nm) is plotted along the abscissa axis.

DETAILED DESCRIPTION OF THE INVENTION

The plastic optical fiber of the present invention is composed basically of a fiber of a core-and-cladding structure having a core component and a cladding component. However, for example, a protection layer for improving, for example, the heat resistance of the fiber or one or more coating layers may be provided outside the fiber of the core-and-cladding structure. Further, tension members such as polymer fibers, metal wires, etc., films, paper-like materials, metal foils or the like may be intervened in the fiber.

Figure 1:
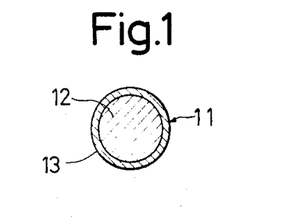
FIGS. 1 to 6 respectively show the lateral cross-sectional view of constitution examples of the plastic optical fiber of the present invention.

FIG. 1 shows a fiber 11 of a core-and-cladding structure consisting of a core 12 and a cladding 13.

Figure 2:
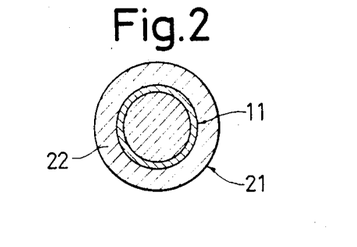

FIG. 2 shows a fiber 21 provided with a protection layer 22 outside the fiber 11 shown in FIG. 1.

Figure 3:
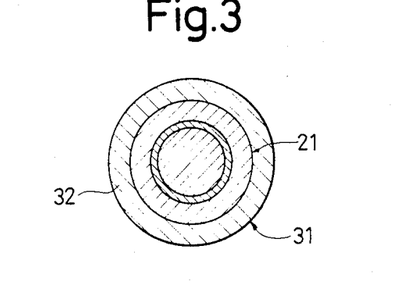

FIG. 3 shows a fiber 31 provided with a primary coating layer 32 outside the fiber 21 shown in FIG. 2.

Figure 4:
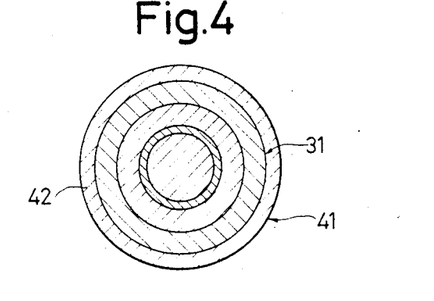

FIG. 4 shows a fiber 41 provided with a secondary coating layer 42 outside the fiber 31 shown in FIG. 3.

Figure 5:
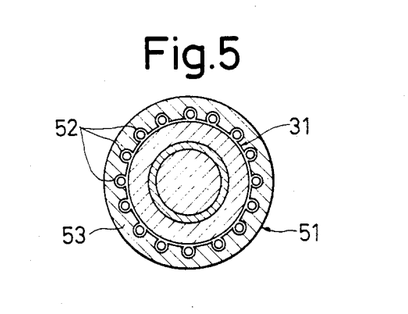

FIG. 5 shows a fiber 51 having tension members 52, 52, 52 . . . intervened on the outer periphery of the fiber 31 of three-layer structure shown in FIG. 3 and provided with a coating layer 53 on the outer side thereof.

Figure 6:
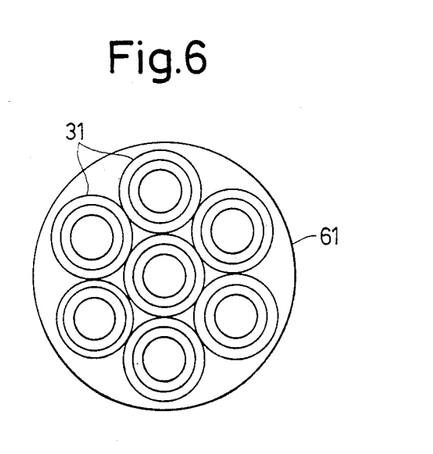

FIG. 6 shows a fiber 61 obtained by bundling a plurality of fibers 31, 31, 31 . . . of three-layer structure shown in FIG. 3 and coating the resulting bundle.

The polycarbonate used as material of the core in the present invention is preferably expressed by the formula wherein n represents a polymerization degree.

Concrete examples thereof are alicyclic polycarbonates of the above formula wherein $R_1$ is expressed by and aromatic polycarbonates of the formula wherein $R_1$ is expressed by -continued Further, copolymers of these compounds with dioxy compounds such as 4,4'-dioxy-diphenylether, ethylene glycol, p-xylylene glycol, 1,6-hexanediol, etc. may also be used. From the viewpoint of heat deformation temperature, those having a thermal deformation temperature of 120° C. or higher are preferred. The heat deformation temperature referred to herein means a value measured under a load of 4.6 Kg/cm$^2$ according to ASTM D-648.

The polycarbonate has an intrinsic viscosity ($\eta$) as measured in methylene chloride at 20° C., in the range of preferably 0.3 to 0.6 dl/g, more preferably 0.35 to 0.45 dl/g.

If the intrinsic viscosity is lower than 0.3 dl/g, the polycarbonate crystallizes in the spinning machine to increase the transmission loss of the resulting optical fiber, while if the intrinsic viscosity exceeds 0.6 dl/g, control of the unevenness of fiber diameter is very difficult.

As to the melt flow rate [MFR]$_1$ [JIS K7210-1976, method A (manually cutting method), ASTM D-1238 or ISO 1133; test temperature 230° C., test load 5 kg, die length 8,000±0.025 mm, inner diameter 2,095±0.005 mm, quantity of sample filled 5 g, and time of sample collected about 30 seconds] and the molecular weight [MW]$_1$ of the core material polycarbonate corresponding to the intrinsic viscosity within the above range, their preferred values are within the following ranges of inequalities [III] and [IV]:

$$3 \text{ g/10 min.} \leq [MFR]_1 \leq 30 \text{ g/10 min.} \quad [III]$$

$$1.3 \times 10^4 \leq [MW]_1 \leq 2.8 \times 10^4 \quad [IV]$$

If [MFR]$_1$ is less than 3 g/10 min., increase in the light transmission loss due to orientation strain occurs at relatively low spinning temperatures, while increase in the light transmission loss due to the thermal deterioration of polymer occurs at high spinning temperatures at which no orientation strain occurs. If the $[MFR]_1$ exceeds 30 g/10 min., the spinning temperature range within which the unevenness of fiber diameter can be inhibited becomes very narrow and also is close to the crystallization temperature; hence increase in the light transmission loss is liable to occur.

In order to control $[MFR]_1$, $[\eta]$ and $[MW]_1$ to the above ranges of values, for example, a conventional process wherein, when polycarbonate constituting the core is prepared by polymerization, the polymerization degree is controlled may be employed.

As the polycarbonate used in the present invention, it is advantageous to use those derived from bisphenol A. More particularly, it is most preferred to use a polycarbonate prepared according to a conventional polymerization process wherein bisphenol A and phosgene are subjected to surface polycondensation in the presence of a solvent at a temperature of 50° C. or lower. The polymer obtained by polymerization according to the process is in the form of an organic solvent solution after completion of the reaction, and from this polymer solution are removed unreacted substances and byproducts by washing, followed by separating the solvent according to various methods such as spray drying method, devolatizing extrusion method, precipitation method, etc. to recover the polymer. Usually, as to polycarbonate used for molding materials, etc., stabilizers such as antioxidant, UV absorber, etc. are added to the above recovered polymer, followed by molding the resulting blend into pellets by melt-extrusion. When polycarbonate is molded into pellets, it is indispensable to heat polycarbonate to its crystalline melting point (differential thermal analysis method; in nitrogen gas; temperature-elevating rate 10° C./min.) or higher and melt it. Thus, polycarbonate is usually subjected to heat history at a high temperature of 280°–320° C.; hence it is the present status that occurrence of thermal decomposition of the polymer is inevitable. Accordingly, even if such molded pellets of polycarbonate containing thermal decomposition products are used and an optical fiber is obtained by melt-extrusion, it is impossible to obtain an optical fiber having superior light transmitting properties. When a polycarbonate once molded into pellets is used, light transmitting properties of particularly visible light rays of 500 nm and 660 nm become far inferior and also the difference between $L_{500}$ and $L_{660}$ is very large.

Whereas, in the present invention, in order to obtain an optical fiber having superior light transmitting characteristics within a visible light region, it is necessary to control the heat history of polycarbonate to indispensably minimum number of times and temperature; thus it is advantageous not to mold the polymer recovered at the polymerization step into pellets, but to subject it directly to melt-spinning, and selectively use the resulting polycarbonate not heated to a temperature exceeding its crystalline melting point.

Recovered powdery polycarbonate may be once stored in or conveyed into dust-free container, can, bag, etc., followed by melt spinning in dus-free state and in the absence of oxygen to obtain an optical fiber. It is also possible not to withdraw powdery polycarbonate recovered into a silo or the like to the outside of the system, but to subject it to spinning by means of a melt-extrusion spinning machine connected directly to the silo to obtain an optical fiber. At that time, the bulk density of the powdery polycarbonate used is preferred to be in the range of 0.3 to 0.7 in the aspect of stably feeding the polycarbonate at the time of melt-extrusion. In the case of powder having a bulk density outside the above range, it is preferred to use an automatic feeder such as belt feeder. Further, it is also possible to feed a polycarbonate solution after washed, e.g. its solution in an organic solvent such as methylene chloride, directly to a melt-spinning machine having a degassing extrusion function and subject it to spinning to obtain an optical fiber.

In order to further exhibit the effectiveness of the present invention, all materials brought into contact with not only main raw materials used in the polymerization step such as bisphenol A, phosgene, etc., but also secondary raw materials such as NaOH aqueous solution, distilled water, solvent such as methylene chloride, polymerization auxiliary agents such as triethylamine, p-tert.-butylphenol, etc., NaOH aqueous solution for washing, HCl aqueous solution for washing, washing water, gases such as nitrogen, air, etc. or other raw materials or reaction product, should be devised to be highly purified to thereby avoid mixing-in of dusts, impurities, etc. If dusts or impurities should have inevitably been mixed in or occurred, it is important to remove them.

As a suitable means for removing dusts or impurities from various liquid raw materials, it is possible to utilize besides distillation or recrystallization, a method of filtering them through a membrane filter made of a material such as polytetrafluoroethylene having a pore diameter of 0.03 to 1.0 $\mu$m or an ultrafiltration membrane, or a reverse osmotic membrane.

In the present invention, it is undesirable to use a stabilizer having an absorption wavelength within a visible light region for the core material polycarbonate.

As another process for preparing a polycarbonate, an ester interchange method (or fusion method) has been known, but a polycarbonate prepared according to this process cannot be used for the present invention. The reason is that since the polycondensation reaction in this process is carried out at a high temperature of 250° to 300° C., the resulting polymer is so highly colored that its use for the optical fiber results in a very large transmission loss.

As the cladding, a substantially transparent polymer having a refractive index less than that of the core component preferably by 0.01 or more may be used, but usually the polymer is preferred to be chosen from among those having a difference between the refractive index of the sheath component and that of the core component in the range of 0.01 to 0.15. The kind of the polymer constituting the cladding component has no particular limitation, but those which have so far been known may be sufficient.

Concrete examples thereof are polymethyl methacrylate (n=1.49), styrene/methyl methacrylate copolymer (n=1.50–1.58), poly 4-methylpentene-1 (n=1.46), ethylene/vinyl acetate copolymer (n=1.46–1.50), polycarbonate (n=1.50–1.57), fluorine-containing polymers such as fluorine-containing polymethyl methacrylate (n=1.38–1.45), fluorinated vinylidene polymers (n=1.38–1.42), fluorinated vinylidene/hexafluoropropylene copolymer (n=1.38–1.42), methyl methacrylate/styrene, vinyltoluene or α-methylstyrene/-maleic anhydride tertiary or quaternary copolymers (n=1.50–1.58), etc.

As to these polymers, in order to improve the peel strength between layers of core-cladding or cladding-protecting layer, unsaturated carboxylic acids such as acrylic acid, methacrylic acid, itaconic acid, etc., unsaturated glycidyl monomers such as glycidyl acrylate or methacrylate, β-methylglycidyl acrylate or methacrylate, acrylamide, methacrylamide and their derivatives, hydrophilic monomers such as hydroxyalkyl acrylate or methacrylate, etc. may be copolymerized.

As polymers for highly general-purpose among the above enumerated polymers, methacrylic polymers such as polymethyl methacrylate and fluorine-containing polymers such as polymers obtained by polymerizing esters of methacrylic acid with fluorinated alcohols as disclosed in Japanese patent publication Nos. 43-8978/1968, 56-8321/1981, and 56-8323/1981 and Japanese patent application laid-open No. 53-60243/1978, etc. are usable. Concrete examples of such esters are 2,2,2-trifluoroethyl methacrylate, 2,2,3,3-tetrafluoropropyl methacrylate, 2,2,3,3,3-pentafluoropropyl methacrylate, etc. Further, copolymers of one or more kinds of these fluorine-containing methacrylic acid esters with fluorine-containing methacrylic acid esters, vinyl monomers copolymerizable with these esters, and vinyl monomers capable of forming hydrolytic homopolymers, as disclosed in Japanese patent application laid-open Nos. 59-7311/1984, 59-116706/1984, etc. may be used.

Further, homopolymers or copolymers of esters of α-fluoroacrylic acid with a fluorinated alkyl alcohol may also be used as the sheath material.

As homopolymers or copolymers of such α-fluoroacrylic acid esters, polymers containing at least one of repetition units expressed by the following formula [II] are exemplified:

[II]

wherein $R_2$ represents an alkyl group of 1 to 5 carbon atoms, a fluorinated alkyl group of 1 to 5 carbon atoms or a cycloalkyl group of 3 to 6 carbon atoms.

In the above repetition units of the formula [II] constituting the cladding material layer used in the present invention, examples of alkyl group of 1 to 5 carbon atoms as $R_2$ are methyl group, ethyl group, n-propyl group, iso-propyl group, n-butyl group, iso-butyl group, sec-butyl group, tert-butyl group, etc. Examples of fluorinated alkyl group of 1 to 5 carbon atoms as $R_2$ are —$CH_2F$, —$CH_2CF_3$, —$CH_2CF_2CF_3$, —$CH_2CF_2CF_2H$, —$CH_2CH_2CF_2CF_2CF_3$, —$CH_2CF_2CF_2CF_2CF_2H$, —$CH_2CF_2CF_2CF_2CF_3$, etc.

Examples of the cycloalkyl group of 3 to 6 carbon atoms expressed by $R_2$ are cyclopropyl group, cyclobutyl group, cyclopentyl group and cyclohexyl group. One or more of hydrogen atoms constituting such an alkyl group, fluorinated alkyl group or cycloalkyl group may be replaced by e.g. halogen atom, monovalent organic group or the like.

$R_2$ in the repetition units of the formula [II] is more preferably an alkyl group of 1 to 3 carbon atoms or a fluorinated alkyl group of 1 to 3 carbon atoms.

The melt flow rate of the cladding material layer polymer, $[MFR]_2$, whose measurement method is the same as that in the case of $[MFR]_1$ is preferred to satisfy the inequality [IV] of $$[MFR]_1 \leq [MFR]_2 \leq 40 \text{ g/10 min.} \qquad [IV].$$

If the value of $[MFR]_2$ is less than that of $[MFR]_1$, the polymer flow inside the nozzle is liable to be turbulent to increase the light transmission loss due to unevenness of the intersurface between the core and the cladding i.e. the structural unevenness. If the value of $[MFR]_2$ exceeds 40 g/10 min., the coating unevenness of the cladding not only increases, but also the strength of the cladding material itself becomes low so that the percentage retention of light quantity in the bent fiber becomes small.

The more preferred range of $[MFR]_2$ is as follows:

$$[MFR]_1 \leq [MFR]_2 \leq 30 \text{ g/10 min.},$$

and the further more preferred range thereof is as follows:

$$7 \text{ g/10 min.} \leq [MFR]_2 \leq 20 \text{ g/10 min.}$$

In particular, when the cladding is composed of a polymer containing as its main component, at least one of the repetition units expressed by the above formula [II], and having a $[MFR]_1$ and a $[MFR]_2$ satisfying the above inequalities [III] and [IV], respectively, it is possible to obtain an optical fiber which is superior in heat resistance, superior in resistance to repeated bending actions and small in the light transmission loss.

In the constitution examples of the plastic optical fiber of the present invention shown in FIGS. 2-6, the organic polymers constituting the protection layer 3, the coating layer 4, etc. can be, if desired, optionally chosen, intending to improve various characteristics of the plastic optical fiber besides the characteristics whose improvement is aimed according to the present invention.

The polymer used as the material for the protection layer 22 is preferred to be a heat-shrinkable polymer. Further, when the polymer has a heat deformation temperature of 100° C. or higher, and particularly when it is combined with a cladding composed of the above-mentioned fluorine-containing polymers, an optical fiber which is preferred in the aspect of heat resistance and mechanical properties is obtained.

If the heat deformation temperature is lower than 100° C., there occurs the surface fusion of the optical fiber or the intersurface turbulence of the core and cladding thereof under severe conditions, for example, those in the engine room of automobiles, to notably increase the light transmission loss.

As the polymer having a heat deformation temperature of 100° C. or higher, the so-called engineering plastics are usable such as polyesters, polyamides, poly-4-methylpentene-1, polyfluorinated vinylidene, polyacetal, polysulfone, polytetramethylene terephthalate, polyethylene terephthalate, polypropylene, polyoxymethylene, polybutene, ABS resin, polyphenylene oxide, polycarbonate, water-crosslinking polyolefins, etc. Above all, when polycarbonate having a heat deformation temperature of 125° C. or higher is used as the polymer for the protection layer and this protection layer is combined with a cladding composed of a polymer containing as its main component, at least one of the repetition units expressed by the above formula [II], then it is possible to obtain an optical fiber which is particularly superior in the aspect of heat resistance, mechanical properties, etc.

Further, it is also possible to fill an inorganic or organic material such as carbon black, talc, glass fibers, aromatic polyamide fibers, carbon fibers, etc. in the polymer used as the protection layer 22.

Further, as other preferred polymers constituting the protection layer 22, when a polymer having a low flexural modulus is used, resistance to repeated bending actions, high-impact resistance and edgewise pressure characteristics are improved. The flexural modulus is preferably 5,000 Kg/cm$^2$ or less. When a protection layer composed of a polymer having such a range of flexural modulus is combined with a cladding component of a polymer containing as its main component, at least one of the repetition units expressed by the above formula [II], then improvement effects on heat resistance, resistance to repeated bending actions and light transmission loss are notably enhanced. Such a polymer having a flexural modulus of 5,000 Kg/cm$^2$ or less may be chosen from e.g., among medium and low density polyethylenes such as linear low density polyethylene, ethylene copolymer resins such as ethylene-ethyl methacrylate copolymer (EEA), ethylene-vinyl acetate copolymer (EVA), ethylene terpolymers, chlorinated polyethylene, etc., ionomer fluorine elastomers, polyvinyl chloride, etc., but the polymer is not limited to these polymers, that is, it is possible to choose and use the polymer from among one kind or a blend of two kinds or more of organic polymers which are so far known or will be found in the future, but have a flexural modulus of 5,000 Kg/cm$^2$ or less.

Further, as the jacketing material constituting the coating layers 32, 42, 53, polymers may be suitably chosen from among organic polymers usable for the above protecting layer 22, including polyolefin resins such as polypropylene and used. Still further, in order to improve for example the heat resistance, heat-shrinkable characteristics, light transmitting characteristics, etc. of the optical fiber, a plastic having a silane-crosslinked structure may be chosen and used.

For example, by providing a coating layer of a plastic having a silane-crosslinked structure, outside an optical fiber consisting of a core material layer, a cladding material layer and a protection layer, cable processing by means of a coating material having a higher heat resistance at high temperatures becomes possible.

When a plastic coating layer having a silane-crosslinked structure is provided as the outer layer of the plastic optical fiber of the present invention, a plastic coating layer having a silane-crosslinked structure may be used which is composed of a silane-crosslinked structure consisting of —Si—O—Si— and an organic polymer as a plastic structure selected from among polyethylene, chlorinated polyethylene, ethylene-propylene copolymer, ethylene-vinyl acetate copolymer, ethylene-ethyl acrylate copolymer, and tetrafluorinated ethylene-propylene copolymer.

A concrete example of the plastic having a silane-crosslinked structure is silane-grafted moisture-crosslinked polyolefins. A general type of such silane-grrafted moisture-crosslinked polyolefins is those obtained by reacting an alkoxy silane grafted onto or copolymerized with polyethylene or polypropylene chain, with water or the like, to form Si—O—Si bond through condensation to thereby effect crosslinking. As commercially available silane-grafted moisture-crosslinked polyethylene or silane-grafted moisture-crosslinked polyolefin, "Linklon", "Linklon-X", etc. (tradenames of products manufactured by Mitsubishi Petrochemical Company) are exemplified.

As the base polymer of the silane-grafted moisture-crosslinked polyolefins, low density polyethylene, linear low density polyethylene, medium density polyethylene, high density polyethylene, isotactic polypropylene and further, copolymers, block copolymers or blends thereof, etc. may be used in accordance with the object, but for example in order to endure a long term use at 115° C. required inside the engine room of automobiles, it is necessary to use a silane-grafted moisture-crosslinked polyethylene having a medium or higher density (a density of 0.935 g/cm$^3$ or higher). By using such a silane-grafted moisture-crosslinked polyethylene, not only heat resistance but also oil-resistant or gasoline-resistant characteristics, etc. which raise problem inside automobiles or ships are also improved.

These silane-grafted moisture-crosslinked polyolefins may be produced e.g. by forced crosslinking in boiling water, hot steam, etc., or may be subjected to crosslinking reaction by the action of moisture in the atmosphere through exposure in the atmosphere.

As to the spinning process of the plastic optical fiber of the present invention, the following three processes are illustrated in view of the process of coating the cladding 13 or the protection layer 22 on the core 12:

① the so-called composite spinning process wherein the respective components constituting two layers of the core 12 and the cladding 13 or three layers of the core 12, the cladding 13 and the protection layer 22 are blended and extruded in molten state through specific nozzles and shaped;

② a compromised process of the composite spinning process and a coating process wherein the core 12 alone or the core 12 and cladding 13 alone are shaped according to the above composite spinning process, followed by coating onto the resulting shaped material, the component(s) of the cladding 13 or the protection layer 22 or the coating layers 32, 42, 53 dissolved in a suitable solvent and then removing the solvent to obtain an optical fiber; and ③ a coating process wherein the core component 12 is first shaped into a definite fiber, followed by coating thereon the cladding component 13 dissolved in a suitable solvent and then removing the solvent, and in the case of three layers, further coating thereon the protection layer component 22 or the coating layers 32, 42, 53 dissolved in a suitable solvent and then removing the solvent.

When these three processes are compared, the composite spinning process is a power-saving and energy-saving process having a high productivity and capable of simplifying the apparatus. Further, this process has advantages that it is possible to produce an optical fiber having a broad range of sizes and the process control is easy; hence it is commercially very advantageous. Still further, according to this process, it is possible to produce an optical fiber having a high performance at a low cost.

Figure 7:
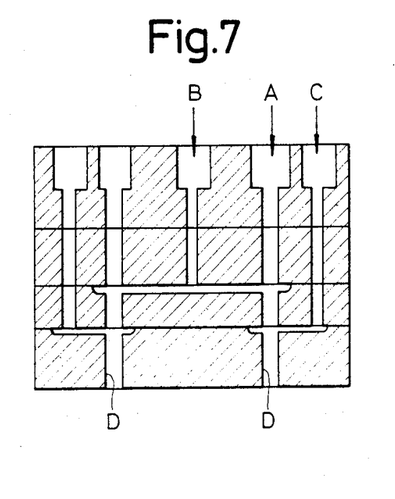
FIGS. 7 and 8 respectively show the vertical cross-sectional views illustrating the spinning dies used for producing an optical fiber of a three-layer type.
Figure 8:
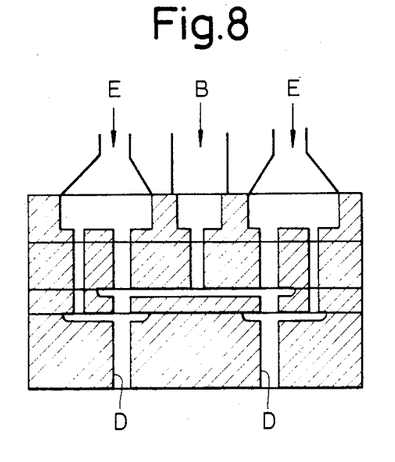
Figure 9:
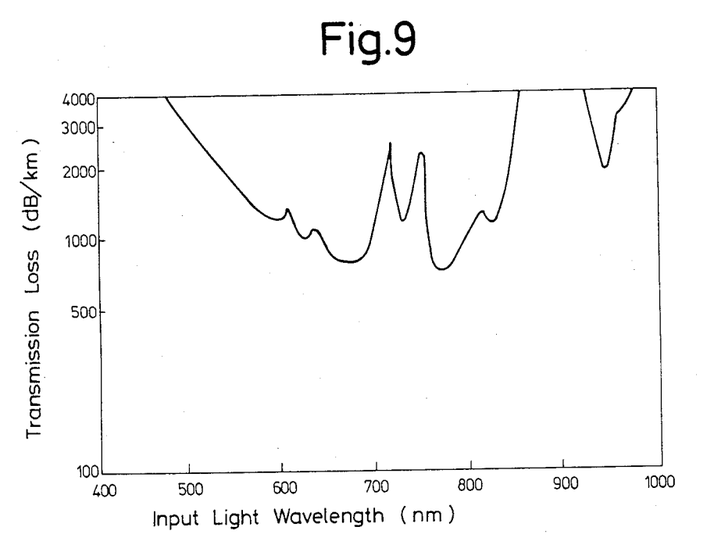
FIG. 9 shows a graph illustrating the light transmitting characteristics of the plastic optical fiber of the present invention, produced in Example 1.

In the case of the composite spinning process, the optical fiber is produced by means of a composite spinning machine consisting of a melt-extruder for the core compponent and a melt-extruder for the cladding comp­ponent and in the case of three layers, further a melt-extruder for the protection layer. The core component is melted by the melt-extruder and fed to a spinning head in a definite quantity by means of a metering pump. The cladding component and in the case of three layers, the protection layer component are also similarly fed to the spinning head, respectively. These components are shaped into a two layer or three layer structure in the spinning die inside the spinning head, extruded, cooled and solidified and taken up, and in some cases, stretched or subjected to annealing treatment. FIG. 7 shows an embodiment of the cross-section of a spinning die used in the case where the components are shaped into a three-layer structure. A core component is fed from (A), a cladding component, from (B), and a protection layer component, from (C), and these components are extruded from (D). Further, for example in the case where the core component and the protection layer component are of the same material, these components may be fed to the spinning head through the same route, and one component is distributed by means of a spinning die and used as shown in FIG. 8. In FIG. 8, the core component and the protection layer component are fed from (E), distributed within the die, and shaped together with the cladding component fed from (B) into a three-layer structure which is then extruded from (D).

The size and thickness of the core 12, the cladding 13, the protection layer 22 and the coating layers 32, 42, 53 in the plastic optical fiber of the present invention are suitably set depending on the use object of the optical fiber. For example, in the spinning die of FIG. 7 or FIG. 8, the size and thickness are controlled by varying the diameter and length of the orifices in the respective feeding ports.

As the melt-extruder for the core component in the present invention, an extruder having a vent port is preferred. The reason is that by the use of the extruder having a vent port, the volatile matters remaining in the polymers such as solvent, moisture, etc. can be effectively removed completely in dust-free state and in the absence of oxygen. The temperature of the core component in the melt-extruder is indispensable to exceed the crystalline melting point of polycarbonate as measured according to differential thermal analysis, but if it is too high, thermal deterioration of polymer occurs and the transmission loss of the resulting optical fiber increases. Thus, the temperature of the core component in the melt-extruder is preferably in the range of 230° to 300° C., more preferably in the range of 240° to 280° C.

The polymer melted in the extruder is quantitatively fed via a gear pump into the nozzle inside the spinning head, and then extruded from the nozzle hole. In the present invention, the polymer temperature at the time of the extrusion is lowered down to a temperature range of from its crystalline melting point or lower to 200° C. or higher, by means of allowing it to cool, cooling, etc. This is preferred in the aspect of controlling the unevenness of fiber diameter to thereby ensure further excellent light transmitting characteristics. Reduction in the polymer temperature is advantageous to carry out while, the polymer is sent from the extruder to the gear pump, or while the polymer is distributed within the spinning head and etruded from the nozzle. If the polymer temperature is high, the unevenness of fiber diameter increases, while it is too low, the crystallization of polycarbonate proceeds to increase the transmission loss.

The present invention will be described in more detail by way of Examples. The parts in Examples are by weight.

Evaluation of the light transmitting performance was carried out according to the following method:

Evaluation of light transmission loss

Figure 11:
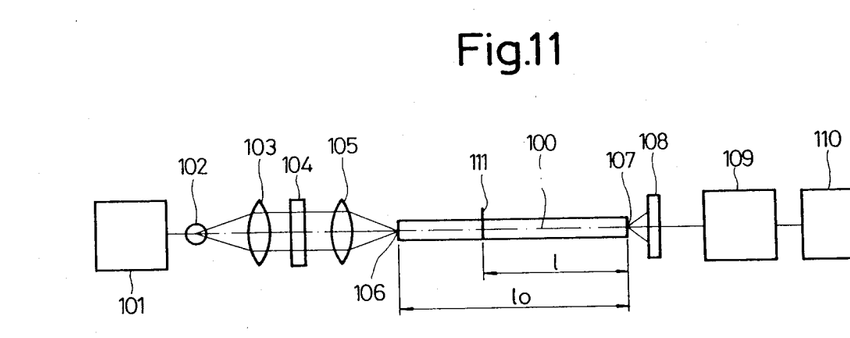
FIG. 11 shows an apparatus for measuring the transmission loss, employed in Examples.

The transmission loss of the resulting plastic optical fiber was measured by means of an apparatus shown in FIG. 11.

A light radiated from a halogen lamp driven by a stabilized electric source 101 is made parallel beams by means of a lens 103, then monochronized by an interference filter 104 and further concentrated onto the focus of a lens 105 having the same number of openings as those of the light transmittable fiber 100. The input light from the input edge face 106 of the plastic optical fiber placed on the above focus attenuates and outgoes from the outgoing edge face 107. This outgoing light is converted into electric current by means of a photodiode having a sufficient broad area 108, which current is amplified by an amplifier 109 of current-voltage conversion type and then read as voltage value by means of a voltmeter 110.

The measurement of the transmission loss is carried out according to the following procedure:

A light transmittable fiber 100 is first cut at right angle to the fiber axis at both the edge faces so as to give a length of $l_0$, the resulting surface is finished into a smooth face and the resulting fiber is fitted to the above-mentioned apparatus so that the input edge face 106 and the outgoing edge surface 107 cannot be moved during the measurement. The room is darkened and the value indicated by the voltmeter is made $I_1$. A room lamp is then lighted and the outgoing edge face 107 is removed from the apparatus, followed by cutting the light transmittable fiber 100 at a point 111 apart from the edge face by a length of l. The edge face of the optical fiber fitted to the apparatus is finished in the same manner as the original into a face at a right angle to the fiber axis, and this face is fitted to the apparatus as a new outgoing edge face.

In order to keep the quantity of input light constant during these operations, care is taken so that the input edge face 106 cannot be moved. The room is again darkened and the value indicated by the voltmeter is read and this value is made $I_2$. The light transmission loss $\alpha$ is calculated according to the following equation:

$$\alpha = \frac{10}{l} \log\left(\frac{I_2}{I_1}\right) (dB/Km)$$

wherein l: length of optical fiber (Km)
$I_1$, $I_2$: light quantity (value read by voltmeter)
In addition, the measurement conditions in the present invention are as follows:
  Interference filter (main length): 650–770 nm
  $l_0$ (total length of optical fiber): 5–50 m
  l (cut length of optical fiber): 4–20 m
  D (diameter of bobbin): 190 mm
In this case, a bobbin is used in order to make the apparatus compact, and the residual optical fiber is taken up on a bobbin (not shown) so that the distance between the input edge face 106 and the outgoing edge face 107 can be about 1 m.

EXAMPLE 1

Deoxygenated, distilled water (14 parts) was added to a reactor equipped with a stirrer, a reflux condenser, a pH electrode and means for adding phosgene and NaOH aqueous solution, followed by adding 2,2-bis(4-hydroxyphenyl)propane (9 parts) and p-tert-butylphenol (1.2 part) and triethylamine (1 part) as polymerization auxiliary agents to the reactor, agitating the contents for 10 minutes, successively adding methylene chloride (23 parts) to the mixture, then adding phosgene (4.5 parts) to the resulting mixture at 45° C. over about one hour, and at the same time adding 50% aqueous solution of NaOH so as to keep the pH at 9.0.

After completion of the reaction, the resulting polycarbonate present in the form of methylene chloride solution was sufficiently washed with NaOH aqueous solution, HCl aqueous solution and distilled water. The solvent was removed from the resulting solution by means of a spray dryer at 150° C. to obtain powder of polycarbonate. This polycarbonate had an intrinsic viscosity of 0.43 dl/g as measured in methylene chloride at 20° C., a Mw/Mn of 2.90, a crystalline melting point of 230° C. as measured by differential thermal analysis (in nitrogen gas; temperature-raising rate 10° C./min.), and a refractive index of 1.585.

This powdery polycarbonate was fed to a hopper port in oxygen-free state, melted by means of a vent extruder set to a melt part temperature of 260° C., a vent part temperature of 270° C. (degree of vacuum at vent: 10 mmHg), and a tip end part temperature of 240° C., and further fed via a gear pump at 230° C. to a core-and-cladding two component composite spinning head, as a core component polymer.

On the other hand, poly 2,2,3,3,3-pentafluoropropyl methacrylate having a refractive index of 1.405 was fed to the core-cladding two component composite spinning head as a cladding component polymer.

The molten polymers were extruded at 220° C. by means of a spinning die, cooled, solidified and taken up to obtain an optical fiber having a core diameter of 980 μm, a cladding thickness of 10 μm and an outer diameter of 1,000 μm. The light transmitting characteristics of this optical fiber are shown in FIG. 4. As apparent from FIG. 4, the light transmitting characteristics have been notably improved as compared with those of conventional optical fiber of polycarbonate, that is, the light transmission loss at a wavelength of 500 μm was 2,600 dB/km, that at a wavelength of 660 nm, 780 dB/km and that at a wavelength of 770 nm, 700 dB/km. Further, visible light beams of 700 nm or less which have been difficult to transmit by means of conventional optical fiber of polycarbonate, have become possible to transmit, and at the same time, it has been clarified for the first time that absorption peaks are present at 600 nm and 630 nm.

$L_{500}-L_{660}$ was 1,820 dB/km. When a white light of a tungsten lamp was input into one side of the fiber having the length of 5 m, the color of the output light from the other side of the fiber was observed to be pale yellow.

EXAMPLE 2

The methylene chloride solution of desalted and washed polycarbonate obtained in Example 1 was subjected to reprecipitation method with methanol filtered through a membrane filter of polytetrafluoroethylene having a pore diameter of 0.1 μm to obtain polycarbonate powder. Using this polycarbonate powder, an optical fiber was obtained in the same manner as in Example 1 except that polymethyl methacrylate ($n_D$ 1.49) was used as the cladding material polymer. The light transmission loss was 2,500 dB/km at a wavelength of 500 nm, 730 dB/km at 660 nm and 660 dB/km at 770 nm, that is, extremely low.

$L_{500}-L_{660}$ was 1,770 dB/km, and the coloration of the output light was extremely slight as in the case of Example 1.

EXAMPLE 3

The methylene chloride solution of desalted and washed polycarbonate solution obtained in Example 1 was filtered through a membrane filter of polytetrafluoroethylene to remove foreign matters having a size of 0.3 μm or larger, and further continuously the resulting filtrate was fed to an extruder having a solvent-removing part. The vent part temperature was 270° C. and the degree of vacuum at vent was 5 mmHg. The melted polymer was fed via a gear pump at 230° C. to a core-cladding-protecting layer three component composite spinning head at 220° C.

On the other hand, a copolymer obtained from a monomer mixture of methyl α-fluoroacrylate with 2,2,3,3,3-pentafluoropropyl α-fluoroacrylate (ratio by weight, 1:1) was fed to the core-cladding-protecting layer three component composite spinning head, as a cladding material polymer. Further, as a protection layer material polymer, a commercially available polycarbonate (Yupilon H-3000, tradename of product manufactured by Mitsubishi Gas Chemical Company) was melted and fed to the core-cladding-protection layer three component composite spinning head.

The molten polymers fed at the same time were extruded at 220° C. by means of a spinning die, then cooled, solidified, subjected to drawing to 1.5 times the original length at 155° C. and taken up.

The resulting optical fiber had a core material diameter of 900 μm, a cladding thickness of 5 μm, a protecting layer thickness of 45 μm and an outer diameter of 1,000 μm, and the light transmission loss was 1,800 dB/km at a wavelength of 500 nm, 580 dB/km at 660 nm and 550 dB/km at 770 nm, that is, its light transmission characteristics were extremely superior. $L_{500}-L_{660}$ was 1,220 dB/km. Further, after this optical fiber was heated at 125° C. for 1,000 hours, the transmission loss was measured. As a result, increase in the loss was as extremely small as 20 dB/km.

COMPARATIVE EXAMPLE 1

The powdery polycarbonate obtained in Example 1 was molded into pellets by means of a devolatizing extruder at 260° C. Using the resulting polycarbonate pellets, an optical fiber was obtained in the same manner as in Example 1. The light transmission loss was as large as 6,500 dB/km at 500 nm, 1,400 dB/km at 660 nm and 1,200 dB/km at 770 nm. A white light of a tungsten lamp was input into this optical fiber having a length of 5 m, and an outgoing light was observed. It was to such an extent that a deep red color was slightly seen, $L_{500}-L_{660}=5,100$ dB/km.

COMPARATIVE EXAMPLE 2

An optical fiber was obtained in the same manner as in Comparative example 1 except that the temperature of the devolatizing extruder was made 320° C.

The light transmission loss was 9,000 dB/km at 500 nm, 2,800 dB/km at 660 nm and 2,100 dB/km at 770 nm. $L_{500}-L_{660}=6,200$ dB/km.

COMPARATIVE EXAMPLE 3

The powdery polycarbonate obtained in Example 1 was tried to subject to extrusion molding at 230° C., but its melt viscosity was so high that molding was impossible.

COMPARATIVE EXAMPLE 4

An optical fiber was tried to obtain in the same manner as in Example 1 except that the temperature of the spinning head was 250° C., but fiber unevenness was very large and fiber breakage occurred frequently during spinning. The fiber diameter varied extremely between 500 μm and 1,500 μm so that the light transmission loss was also as large as 2,200 dB/km at 660 nm.

EXAMPLE 4

The powdery polycarbonate obtained in Example 2 was used as the core material and melted by means of a vent extruder set to a vent part barrel temperature of 270° C. and an extrusion part barrel temperature of 240° C., and further fed via a gear pump at 230° C. to a core-cladding-protection layer three component composite spinning head, as the core material polymer.

On the other hand, a copolymer obtained from a monomer mixture of methyl α-fluoroacrylate with 2,2,3,3,3-pentafluoropropyl α-fluoroacrylate mixed in an equimolecular ratio, as the cladding material polymer, was fed to the core-cladding-protection layer three component composite spinning head. Further, as the protection layer component polymer, a commercially available polycarbonate (Yupilon, a tradename of product manufactured by Mitsubishi Gas Chemical Company; [η] 0.45) was fed at the same time.

The three molten polymers of the core, the clad and the protecting layer fed at the same time were extruded at 230° C. by means of a spinning die, then cooled, solidified and taken up to obtain a core wire of a plastic optical fiber having a core material layer diameter of 920 μm, a cladding material part thickness of 4 μm and a protection layer thickness of 36 μm.

The light transmission loss, heat resistance and properties at repeated bendings of the thus obtained core wire of an optical fiber were evaluated and the results are shown in Table 1.

The evaluation methods of the heat resistance and properties at repeated bendings are as follows:

Heat resistance

The quantity of light transmission loss increased (dB/km) after a fiber obtained by coating polyvinylidene fluoride (melt flow rate: 20 g/10 min.) on the core-cladding structure with heated at 125° C. for 3,000 hours.

Properties at repeated bendings

A fiber was repeatedly bent by 180° on a mandrel having a diameter of five times the fiber diameter, and the number of times of bendings at which the percentage retention of light quantities in the bent fiber reached 50% was read.

EXAMPLES 5–11 AND COMPARATIVE EXAMPLES 5–8

Plastic optical fibers were obtained in the same manner as in Example 4 except that the composition and physical properties of the core and cladding used were varied as shown in Table 1. The characteristics of the resulting fibers were evaluated in the same manners as in Example 4 and the results are shown in Table 1.

TABLE 1

| | Composition and physical properties of core-clad | | | | Fiber characteristics | | | | Properties at Repeated Bending (number of times of bendings at which the percentage retention of light quantity reaches 50%) | Heat resistance (quantity of light transmission loss increased, after heated at 125° C. for 3000 hours, dB/km) |
|---|---|---|---|---|---|---|---|---|---|---|
| | Core | | Clad | | Light transmission loss 500 nm | Light transmission loss 660 nm | Light transmission loss dB/km 770 nm | $L_{500}-L_{660}$ | | |
| Example No. | [η] (g/dl) | [MFR]$_1$ (g/10 min.) | Composition | [MFR]$_2$ (g/10 min.) | | | | | | |
| Example 4 | 0.43 | 5.5 | Copolymer*1 | 10 | 3000 | 850 | 750 | 2150 | 10000 | 100 |
| Example 5 | 0.43 | 5.5 | Copolymer*1 | 7 | 3000 | 850 | 750 | 2150 | 12000 | 100 |
| Example 6 | 0.43 | 5.5 | Copolymer*1 | 15 | 2800 | 800 | 720 | 2000 | 8000 | 100 |
| Example 7 | 0.43 | 5.5 | Copolymer*1 | 25 | 2800 | 800 | 720 | 2000 | 4000 | 100 |
| Comparative Example 5 | 0.43 | 5.5 | Copolymer*1 | 5 | 45000 | 37000 | 35000 | 8000 | 15000 | 100 |
| Example 8 | 0.43 | 5.5 | Copolymer*1 | 45 | 2800 | 800 | 720 | 2000 | 500 | 100 |
| Example 9 | 0.35 | 2.0 | Copolymer*1 | 25 | 2400 | 700 | 650 | 1700 | 3000 | 250 |
| Comparative Exmaple 6 | 0.35 | 2.0 | Copolymer*1 | 10 | 11000 | 4300 | 3800 | 6700 | 10000 | 250 |
| Comparative Example 7 | 0.55 | 3 | Homopolymer*2 | 5 | 7000 | 1500 | 1300 | 5500 | 9000 | 40 |
| Comparative Example 8 | 0.55 | 3 | Homopolymer*2 | 15 | 6500 | 1400 | 1200 | 5100 | 7000 | 40 |
| Example 10 | 0.43 | 5.5 | Homopolymer*2 | 10 | 3100 | 870 | 760 | 2230 | 10000 | 80 |
| Example 11 | 0.43 | 5.5 | Copolymer*3 | 15 | 2600 | 780 | 700 | 1820 | 10000 | 100 |

Note:
Copolymer*1 Copolymer of methyl α-fluoroacrylate with 2,2,3,3,3-pentafluoropropyl α-fluoroacrylate (mol ratio, 50:50)
Homopolymer*2 Homopolymer of methyl α-fluoroacrylate
Copolymer*3 Copolymer of 2,2,2-trifluoroethyl α-fluoroacrylate with methyl α-fluoroacrylate (mol ratio, 85:15)

EXAMPLE 13

The optical fiber which has the three-layered structure according to Example 4 was further coated with a commercially available, silane-grafted moisture-crosslinked polyethylene (Linklon MF-700N, a tradename of a product manufactured by Mitsubishi Petrochemical Company; density, 0.945 g/cm$^3$) to obtain a plastic optical fiber cable having a diameter of 2.2 mm.

The thus obtained cable was further superior in heat resistance, heat shrinkage characteristics, light transmission characteristics, etc.

The plastic optical fiber of the present invention can be used for all applications as a fiber for light transmission, and have a superior heat resistance due to which it can be used even under severe conditions particularly e.g. in automobiles or engine room of ships, further a good resistance to repeated bending actions and yet a low light transmission loss in spite of its core being of polycarbonate.

What is claimed is:

1. A plastic optical fiber comprising polycarbonate as its core material and a polymer, as its cladding material, having a refractive index lower than that of the core material, which is formed by a melt-spinning step, wherein said core material of polycarbonate is supplied to the melt-spinning step in the form of a powder which has not been heated to a temperature exceeding its crystalline melting point at any step other than the melt-spinning step, wherein the relationship between light transmission loss, $L_{500}$ (dB/km), of said fiber as measured at a wavelength of 500 nm and light transmission loss, $L_{660}$ (dB/km), of said fiber measured at a wavelength of 660 nm is expressed by the following relation (I):

$$L_{500} < L_{660} + 4{,}000 \text{ dB/km} \tag{I}$$

2. A plastic optical fiber according to claim 1, wherein said $L_{660}$ is 1,000 dB/km or less.

3. A plastic optical fiber according to claim 1, wherein said polycarbonate as the core material has an intrinsic viscosity of 0.3 to 0.6 dl/g as measured in methylene chloride at 20° C.

4. A plastic optical fiber according to claim 1, wherein said polymer as the cladding material is a fluorine-containing polymer, and said fiber has outside the cladding, a protection layer composed of a polycarbonate having a heat deformation temperature of 100° C. or higher.

5. A plastic optical fiber according to claim 1, wherein said polymer as the cladding material is a polymer having as its main component, at least one of the repetition units expressed by the following formula (II):

$$\text{(II)}$$

wherein R represents an alkyl group of 1 to 5 carbon atoms, a fluorinated alkyl group of 1 to 5 carbon atoms or a cycloalkyl group of 3 to 6 carbon atoms.

6. A plastic optical fiber according to claim 5, wherein the melt flow rate [MFR]$_1$ of said core material and the melt flow rate [MFR]$_2$ of said cladding material have relationships expressed by the following inequalities [III] and [IV]:

$$3 \text{ g/10 min.} \leq [\text{MFR}]_1 \leq 30 \text{ g/10 min.} \tag{III}$$

$$[\text{MFR}]_1 \leq [\text{MFR}]_2 \leq 40 \text{ g/10 min.} \tag{IV}$$

7. A plastic optical fiber according to claim 1, wherein said fiber has outside the cladding, a protection layer composed of a polycarbonate having a heat deformation temperature of 125° C. or higher.

8. A plastic optical fiber according to claim 7, wherein said fiber has outside the protection layer, a coating layer composed of a plastic having a silane-crosslinked structure.

9. A plastic optical fiber according to claim 8, wherein said silane-crosslinked structure is composed of —Si—O—Si—, and said plastic is composed of an organic polymer selected from the group consisting of polyethylene, chlorinated polyethylene, ethylene-propylene copolymer, ethylene-vinyl acetate copolymer, ethylene-ethylacrylate copolymer and tetrafluorinated ethylene-propylene copolymer.

10. A plastic optical fiber according to claim 1, wherein said fiber has outside the cladding, a protection layer composed of an organic polymer having a flexural modulus of 5,000 Kg/cm$^2$ or less.

11. A plastic optical fiber according to claim 10, wherein said fiber has outside the protection layer, a coating layer composed of a plastic having a silane-crosslinked structure.

12. A process for producing a plastic optical fiber by a melt-spinning step, wherein polycarbonate is used as the core material of the fiber and a polymer having a refractive index lower than that of the core material is used as the cladding material thereof; wherein the core material of polycarbonate is supplied to the melt-spinning step in the form of a powder which has not been heated to a temperature exceeding its crystalline melting point at any preceding step other than the melt-spinning step, and then, melted at a temperature exceeding its crystalline melting point in the melt-spinning step.

13. The process of claim 12, wherein said polycarbonate is melted at a temperature exceeding its crystalline melting point in a melt-extruder and extruded from a spinning nozzle either (i) after cooling to a temperature between 200° C. and the crystalline melting temperature of said polycarbonate or (ii) while cooling to a temperature between 200° C. and the crystalline melting temperature of said polycarbonate.

* * * * *

UNITED STATES PATENT AND TRADEMARK OFFICE
CERTIFICATE OF CORRECTION

PATENT NO. : 4,798,445
DATED : Jan. 17, 1989
INVENTOR(S) : Takashi YAMAMOTO et al.

It is certified that error appears in the above-identified patent and that said Letters Patent is hereby corrected as shown below:

On the Title Page, Item [73]:

Please correct the spelling of the Assignee's name as follows:

-- Mitsubishi Rayon Co., Ltd. --

Signed and Sealed this

Eighteenth Day of July, 1989

Attest:

DONALD J. QUIGG

Attesting Officer

Commissioner of Patents and Trademarks